United States Patent [19]

Kirrish et al.

[11] 4,033,243
[45] July 5, 1977

[54] CONTAINER FASTENER SYSTEM

[75] Inventors: Hail Kirrish; Albert J. Provenzano, both of Rockford, Ill.

[73] Assignee: Textron, Inc., Providence, R.I.

[22] Filed: Jan. 30, 1976

[21] Appl. No.: 653,925

[52] U.S. Cl. .................................. 85/4; 85/1 JP; 85/9 R; 151/37; 151/41.73
[51] Int. Cl.² .................. F16B 35/04; F16B 39/282
[58] Field of Search .................. 85/4, 1 JP, 9 R; 151/41.73, 37, 38, 35

[56] References Cited

UNITED STATES PATENTS

| 207,871 | 9/1878 | Horton et al. | 85/1 JP X |
|---|---|---|---|
| 375,350 | 12/1887 | Glover | 85/4 X |
| 1,966,044 | 7/1934 | Place et al. | 151/38 |
| 2,136,523 | 11/1938 | Rosenberg | 85/9 R |
| 2,283,494 | 5/1942 | Erdman | 151/35 |
| 2,722,259 | 11/1955 | Eckenbeck et al. | 151/41.73 |
| 2,751,806 | 6/1956 | Dickie | 85/1 JP X |
| 2,752,814 | 7/1956 | Iaia | 85/1 JP |
| 2,892,650 | 6/1959 | Runton | 85/1 JP X |
| 2,982,166 | 5/1961 | Hobbs | 151/37 X |
| 3,175,454 | 3/1965 | Morse | 85/9 R |
| 3,252,495 | 5/1966 | Waltermire | 151/41.73 |
| 3,299,766 | 1/1967 | Gould et al. | 85/1 R |
| 3,370,631 | 2/1968 | James | 151/37 |
| 3,414,304 | 12/1968 | Miller | 85/4 X |
| 3,459,447 | 8/1969 | Hurd et al. | 85/4 X |
| 3,462,114 | 8/1969 | O'Dell et al. | 85/4 X |

FOREIGN PATENTS OR APPLICATIONS

| 77,023 | 11/1961 | France | 85/77 |
|---|---|---|---|
| 1,079,711 | 4/1960 | Germany | 85/9 R |

Primary Examiner—Ramon S. Britts
Attorney, Agent, or Firm—Olson, Trexler, Wolters, Bushnell & Fosse, Ltd.

[57] ABSTRACT

There is disclosed a novel fastener assembly for use in attaching a composite panel section or the like to a frame section. The fastener assembly comprises a first member for engagement in a bore formed in said frame section, said member including an enlarged, tamper-proof head engaging the exterior surface of said frame section and means for preventing rotation relative to said frame section; and a second member engaged with said first member, said second member being disposed in a coaxial bore formed in said panel, and having an enlarged head for engagement with said panel, said head including drive tool engaging means. In addition, the aforementioned first member engaged with said frame section, includes seal means for attaining a water-tight joint when said respective head portions are brought into clamped engagement with said frame and panel sections.

10 Claims, 17 Drawing Figures

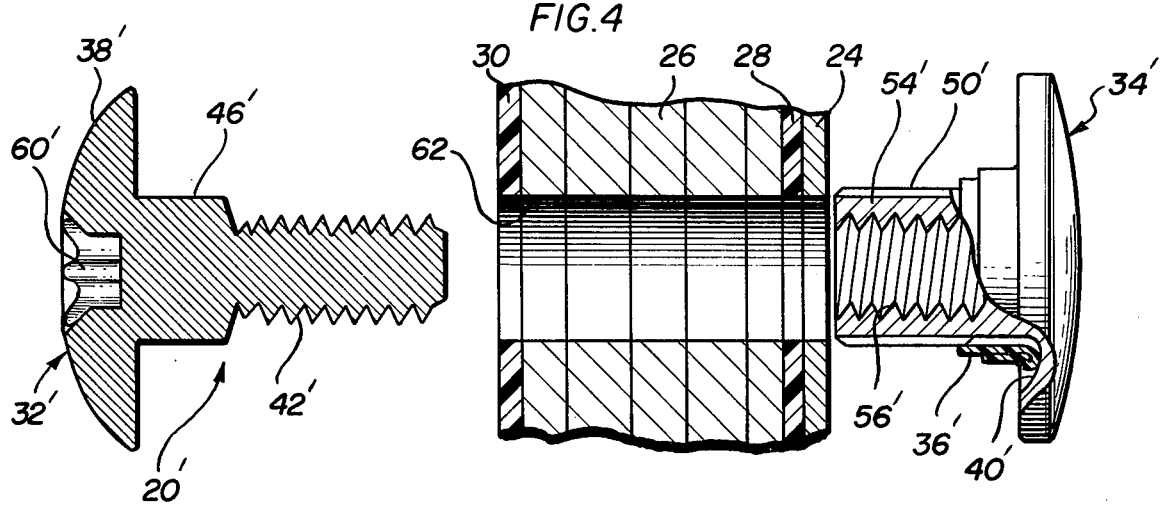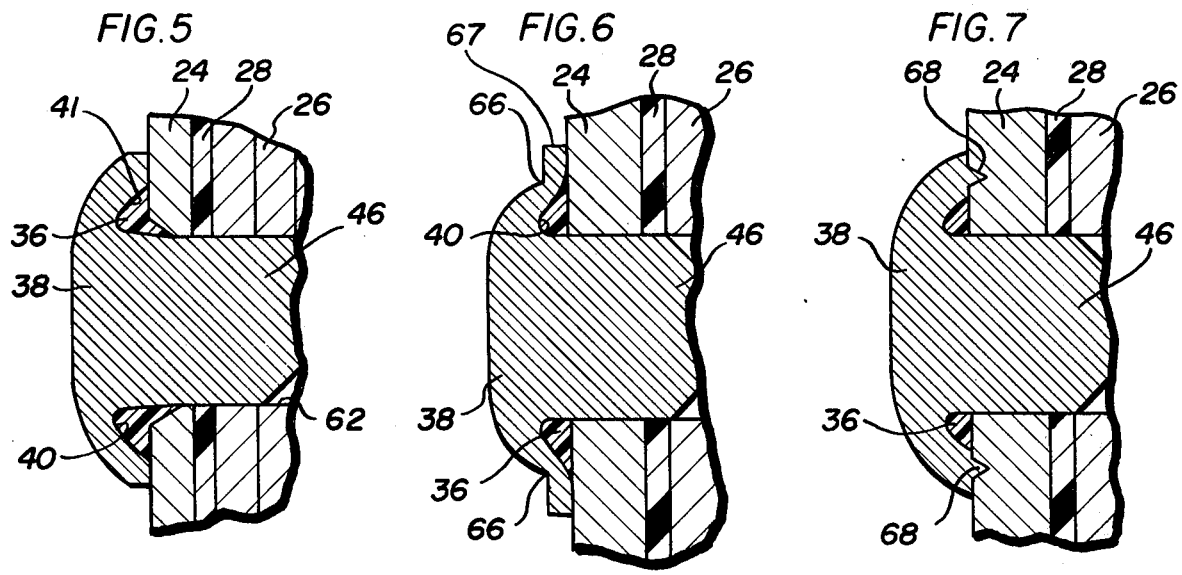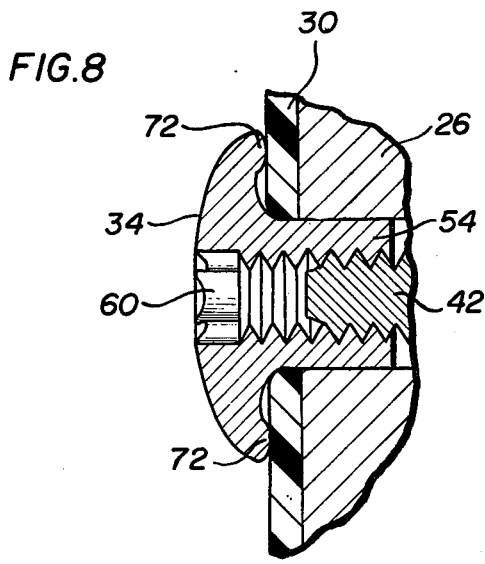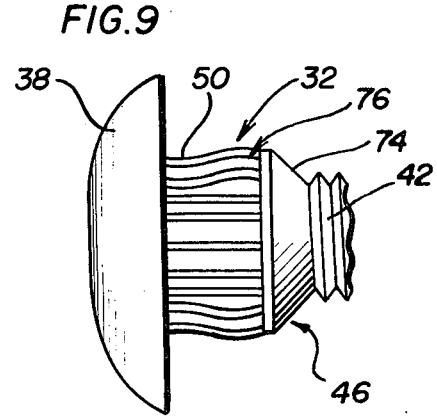

CONTAINER FASTENER SYSTEM

BACKGROUND OF THE INVENTION

The present invention pertains to a fastener system, and more particularly a fastener system for use in joining a composite panel or the like to a section of metal framing, as is used in the construction of large shipping containers, truck trailers or truck bodies.

In the last several years, the transportation industry has moved rapidly toward usage of shipping containers. These units constitute a valuable and necessary labor saving device, in that once loaded they can be transported by rail, truck or ship having the necessity of unloading and reloading the contents. While these containers may be of varied construction, they mainly are fabricated from fiberglass, reinforced polyester plywood panels which are fastened to a metal framework. Metal panels are used in some constructions, especially where an insulated container is desired. In addition to shipping containers, trailer truck bodies are also now being constructed in a similar manner.

It should be noted, that a great number of joints are required in the assembly of each container or trailer body; for example, a normal 40-foot trailer will require between 500 and 600 separate fastener assemblies or joints. Accordingly, the time and/or labor required in the seating of the fastener assembly for each joint is a significant factor in the overall production costs. In addition to being easily and economically installed, each fastener assembly must also be vibration-proof; tamper-proof to prevent thefts in transit; and watertight so that moisture cannot enter and weaken the plywood laminate. The fastener assembly of the present invention provides the abovementioned features, and additional advantages that are not obtained with the prior art assemblies presently being used in container constructions, as will be explained in some detail hereinafter.

Consideration is now directed briefly to the prior art type of fastener systems used in container constructions. In this regard, these systems normally employ a deformable sleeve member and an elongate bolt member which is provided with a frangible section at some intermediate point along the length thereof. A special tool is used which is engaged with the end portion of the bolt member on the side of the frangible section opposite the bolt head, which tool effects deformation of the sleeve into gripping engagement with a portion of the bolt on the opposite side of the frangible section, to achieve the fastener joint. During the deformation of the sleeve, the tool imparts a tensile stress or loading to the bolt which eventually fractures the frangible section, breaking off the distal end engaged by the tool, which end is then discarded.

While the prior art types of fastener systems have been used extensively, they are possessed of a number of inherent disadvantages that are overcome by the present invention. For example, once installed, these prior art systems cannot be adjusted, if preloading is lost due to expansion or contraction of the panel, or the bolt member itself. In addition, these fasteners, once assembled cannot be easily replaced for maintenance purposes, such as to repair damage to the container. These prior art assemblies not only require special tooling, but the assembly thereof required a two-man operation, in most applications. An individual must be stationed on each side of the panel, the first to position the bolt in a performed aperture in the framing and the panel sections, and the other to operate the special deforming tool. Also, the fractured portion of the bolt, which is discarded, constitutes waste that bears on the initial cost of the fastener, which of course must be borne by the manufacturer.

The present invention not only provides a vibration-proof, tamper proof and moisture-proof joint, but does so in a manner which overcomes the above-discussed disadvantages of the prior art assemblies. That is to say, the present invention may be easily installed by one individual, it can be reseated or tightened should preloading become lost; it can be easily replaced; and since it utilizes no special tooling or waste material, the overall cost of the fastener system is reduced.

Briefly, the fastener system of the present invention achieves the above-discussed advantages due to its unique constructions. In this regard, it should be noted that there is provided a novel bolt member that is adapted for mating engagement with a specially constructed nut member to achieve the desired clamping action between the frame and the panel sections. The bolt member includes means which enable it to be set initially in the frame aperture in a manner which precludes rotation thereof and achieves centering of the threaded end portion thereof relative to the panel aperture. Accordingly, a single worker can set a number of these bolt members, and then subsequently engage the nut members therewith to complete the joint. It should be noted that the member of the system which is engaged with the metal frame, i.e., the exterior of the container, is provided with a tamper-proof head, and means to seal against the entry of moisture. The member of the fastener assembly disposed internally of the container includes a drive recess for engagement by a standard power-driven wrench or the like.

Numerous other advantages of the present invention will become more apparent from the detailed description of the drawings and the illustrated embodiments, which follows hereinafter.

DESCRIPTION OF THE DRAWINGS

FIg. 4 is a sectional view of a modified fastener assembly, prior to engagement with the apertured panel and frame sections;

FIGS. 5 – 7, 9 and 10 illustrate various modifications of the bolt head design;

FIG. 8 illustrates a modified form of the nut member, provided with a reduced bearing surface to minimize damage to the panel section interior surface;

DESCRIPTION OF THE ILLUSTRATED EMBODIMENTS

Figure 1:
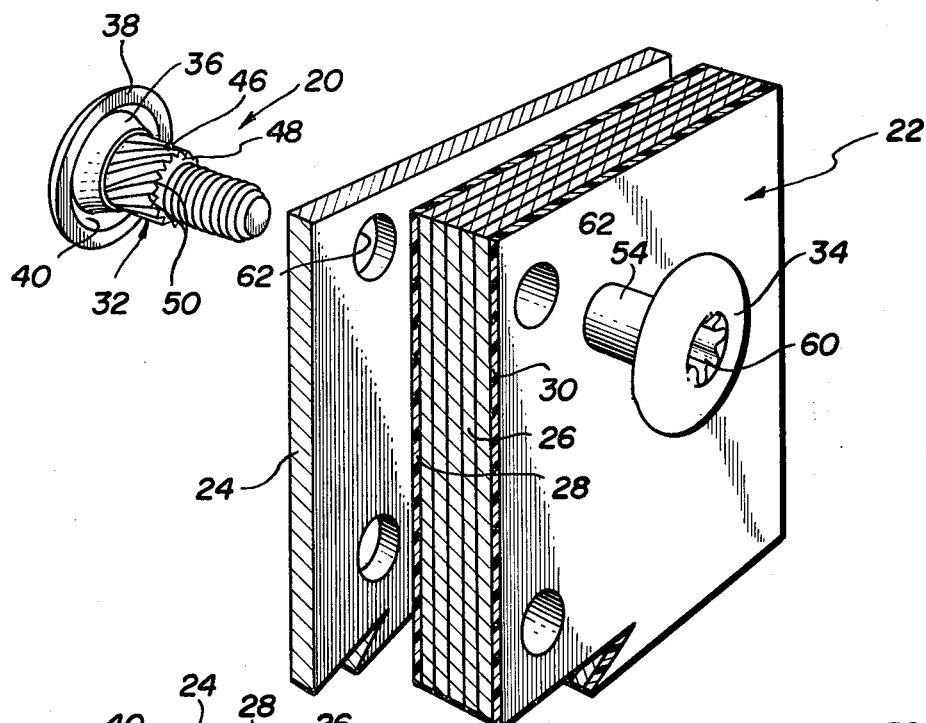
FIG. 1 is a perspective, exploded view of a fastener assembly constructed in accordance with the present invention, disposed in relation to an apertured frame and panel section.
Figure 2:
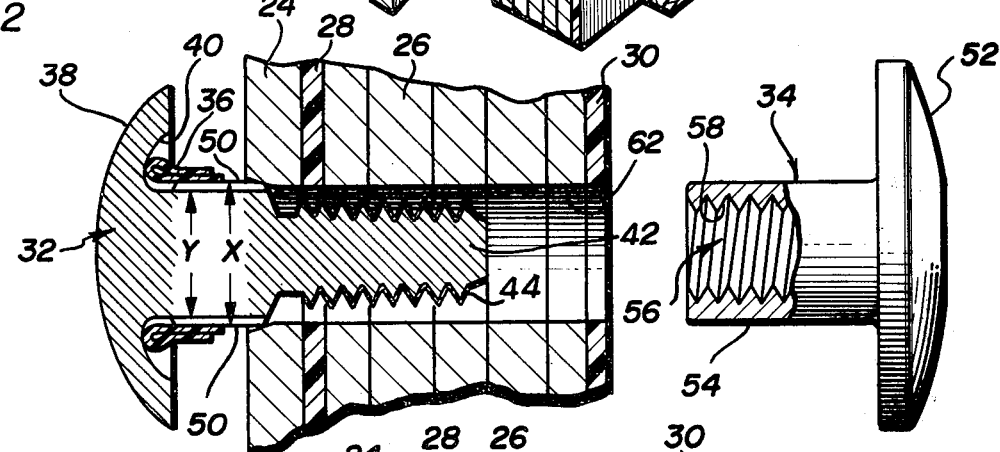
FIG. 2 is a sectional view illustrating the fastener assembly of the present invention upon initial insertion of the bolt member, and prior to engagement of the nut member therewith.
Figure 3:
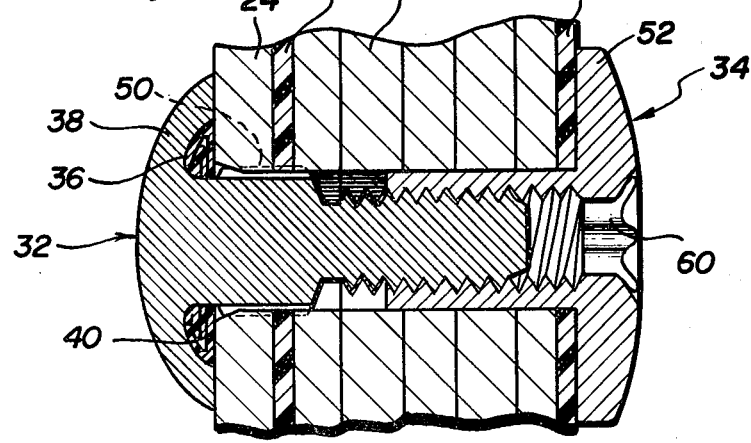
FIG. 3 is a sectional view of a completed joint.

FIGS. 1 – 3 illustrate a preferred form of the fastener assembly of the present invention, which assembly is designated generally 20. The assembly 20 is utilized to achieve clamping engagement between a component panel section or the like 22, and a section of metal framework 24. The panel section 22 may be of varied construction; the drawings illustrating a section which is constructed of a plywood laminate 26 with layers of fiberglass reinforcement 28 and 30 on the opposite sides thereof.

The fastener assembly 20 is comprised primarily of a bolt member 32, a nut member 34 engageable therewith, and a sealing member 36. Bolt member 32 is possessed in a number of unique structural features that contribute to the overall operation of the assembly in the desired manner. More specifically, the bolt member 32 includes an enlarged head portion 38, with an axially facing groove 40 on the undersurface thereof, the purpose of which will become apparent hereinafter. On the end of the bolt member 32 opposite the enlarged head portion 38, there is provided an externally threaded segment 42 which, in the preferred form of the invention, includes a resinous coating 44 to achieve a thread lock with the nut member 34. Disposed intermediate the threaded segment 42 and the head portion 38 is an unthreaded segment 46, which in the illustrated embodiment has a series of knurls or ribs 50 formed thereon. While the knurls 50 are disposed on a spiral in the embodiment of FIGS. 1 – 3, it should be noted that relatively straight, side-by-side knurls may also be used as illustrated in FIG. 4.

Clamping nut member 34 is also specially constructed for the general function of the overall fastener assembly 20. In this regard, nut 34 includes an enlarged clamping head portion 52, and an elongate sleeve portion 54. A bore 56 extends through the entire nut member 34, and is internally threaded, as indicated by reference character 58, in the area of said sleeve portion 54. The portion of the bore 56 proximate the enlarged head portion 52 is formed as a drive tool receiving recess 60.

The sealing member 36 is carried on the unthreaded segment 46 of the bolt member and is disposed in the recess 40. In the illustrated embodiment, the seal 36 is in the form of a reversed bent, or folded over sleeve and is constructed from a resinous material having a high memory characteristic, such as nylon, or any other type of sealant having similar characteristics. That is to say, the material from which the seal 36 is constructed will not take a permanent set upon being compressed. The seal 36 is similar to certain types of sealing elements as disclosed in U.S. Pat. No. 3,299,766, issued Jan. 24, 1967 to W. Gould et al.

FIGS. 2 and 3 illustrate the general assembly operation. Preparatory to assembly, a through aperture 62 is formed in the composite panel section 22 and frame section 24, as illustrated. Aperture 62 is preferably sized to be somewhat less than the maximum diameter "X" through the knurled unthreaded section 46, but greater than the minor diameter "Y" through said section. The bolt member 32, having the tamperproof enlarged head portion 38, is installed on the exterior of the container, that is, in engagement with the outer surface of the metal frame section 24. Initially, the bolt member 32 is positioned in aperture 62 and is then struck a blow with a hammer or the like, causing the knurled unthreaded portion 46 to enter into the aperture 62 in said frame section, with the knurls or splines 50 cutting or biting into the metal defining said aperture. The dimensional relationship between the aperture portion 62 of the frame, and the unthreaded portion 46, is such that preferably only the knurls 50 will engage and bite into the metal, with the base of said unthreaded segment 46 (that is the portion represented by diameter "Y") passing freely into the aperture. The engagement of the knurls 50 with the aperture wall locks the bolt member 32 against rotation. The above-discussed relationship, wherein only the knurls 50 engage the aperture walls, achieves a centering action. In this regard, since only the knurls 50 are engaged, which knurls have a tapered head 48, the stress created upon engagement are uniform about the circumference of the bolt 32. Accordingly, any misalignment of the bolt 32 relative to the aperture 62 is corrected, thereby tending to promote centering of the unthreaded segment 42 with regard to the portion of aperture 62 in the plywood reinforced panel 22. This centering as well as the locking against rotation, is important, as it enables the nut member 34 to be engaged with the bolt member 32 from the opposite side of the panel, without the necessity that a second workman be employed, as will be explained.

Once a number of the bolt members 32 have been preliminarily set in the frame 22 from the exterior of the container, the workman can then move interiorly of the container and engage the respective nut members 34 by use of standard power driver or the like, employing a drive tool engageable in the drive recess 60. In this regard, since the bolt 32 is held against rotation by the engagement of the knurls 50 with the frame 24, and the threaded end portion 42 is centered relative to the aperture 62, is no need for a second workman positioned exteriorly of the container. The entire assembly operation can thus be effected by a single workman.

As the repsective threaded segments on nut member 34 and bolt member 32 are engaged, enlarged head portions 38 and 52 are drawn into engagement with the opposed surfaces of the panel and frame sections, to produce a clamped condition, as shown in FIG. 3. Further, it will be recalled that preferably the externally threaded segment 42 has a resinous coating 44 thereon, which upon engagement with the internal threads 56 of the nut member 34 produce a locking action which tends to prevent the loosening of the joint due to vibration.

As a further point, the knurls 50 on the unthreaded segment 46 are disposed oppositely of the internal and external threads on the bolt and nut members. That is to say, if a right hand thread is utilized for the nut and bolt members 32 and 34, the spiral 50 will be of a left hand orientation. Accordingly, during driving of the nut member 34, any tendency of the bolt to slip will be resisted by the opposite orientation of the splines or knurls 50. That is to say, should the bolt slip slightly, the splines will again reset themselves, as they are disposed oppositely of the direction in which the bolt will tend to rotate during driving of the nut 34. Also, it should be noted that knurls 50 enter the panel section 22. This is significant, as it serves to strengthen the joint attained, and reduces the load placed upon the point of juncture of the threaded segment 42 and the unthreaded segment 46.

As an additional factor, it should be noted that as the enlarged head portion 38 of the bolt member 32 approaches the exterior surface of the frame section 24, the gasket or seal 36 will be compressed. Preferably, the volume of the groove 40 is somewhat less than the uncompressed volume of the gasket 36, such that upon attainment of the condition as shown in FIG. 3, said gasket will be compressed, and will flow radially and axially inward to seal the aperture 62, and thereby prevent the entry of moisture which could severely damage and weaken the plywood laminate 26.

Accordingly, once the fastener assembly 20 is fully seated, as shown in FIG. 3, there is produced a joint which achieves all of the advantages as discussed above. Most significantly, said joint has been achieved with a minimum of waste; without the use of special tooling; and there results a joint which can be serviced if needed at a later date. Further, the numerous fastener assemblies required in each container or trailer assembly, can be achieved by one individual, thereby materially reducing the labor costs involved.

The embodiment of the invention as discussed with regard to FIGS. 1 – 3 constitutes a preferred form of the invention. There are certain special applications, however, wherein modified versions of the basic invention are desired. A number of such modifications are illustrated in FIGS. 4 – 15 and will now be discussed. In this regard, it should be noted that the basic principle of operation of the various assemblies shown does not change, unless specifically noted. For this reason, the basic structural components will be designated by the reference characters employed previously. Where components of the basic assembly have been modified extensively, a prime (') designation will be employed.

With the above in mind, attention is now directed to FIG. 4, wherein a modified fastener assembly 20' is illustrated. Basically, the assembly 20' has been altered, so that the relative position of the components with respect to the frame and panel sections 24 and 22 may be reversed. In this regard, it is the nut member 34' which engages the metal framing section 24, with the bolt member 32' being disposed interiorly to engage the inner surface of panel section 22.

As can be seen from FIG. 4, the nut member 34' has been modified by the elimination of the drive recess, the drive recess 60' for assembly 20' being formed in the enlarged head portion 38' of the bolt member 32'. Correspondingly, the bore 56' in the nut member 34' is no longer a through bore. As a further modification, the nut member 34' is provided with knurls 50' on the exterior of the sleeve segment 54' thereof, and the enlarged head portion 52' of said nut member includes an axially facing groove 40' proximate which a sealing element 36' is disposed.

Seating of the fastener assembly 20', takes place in generally the same manner as that discussed above concerning assembly 20. In this regard, the nut member 34' is initially seating in the aperture 62' with the splines or knurls 50' engaging the metal frame 24 and serving to preclude relative rotation during engagement with the bolt member 32'. The assembly 20' has some advantages over the fastener assembly 20 of FIGS. 1 –3, in that centering of the internally threaded nut member 34' relative to aperture 62 is achieved more easily, than the centering of the bolt member of the embodiment of FIGS. 1 – 3. With the exception of the differences noted above, the overall operation of the fastener assembly in achieving a clamped, waterproof joint is essentially the same as discussed with regard to FIGS. 1 – 3, and a further repetition is believed unnecessary.

FIGS. 5 – 7 and 10 illustrate modified forms of the enlarged head portion 38, such as discussed above with regard to fastener assembly 20 of FIGS. 1 – 3. For purposes of description, the splines or knurls 50 have been deleted, and it should be understood that in use splines 50 or some other form of rotation preventing means must be employed.

Attention is initially directed to FIG. 5, wherein the axially facing groove 40 in this embodiment has been modified slightly. In this regard the radially outer wall 41 of groove 40 is formed to a conical configuration, converging in a direction toward the enlarged head portion 38. During seating of fastener assembly, the conical wall 41 will serve to direct the flow of the material of the gasket 36 inward to fill the space between the unthreaded segment 46 and the wall of aperture 62, as illustrated. As can be seen in this embodiment, the portion of aperture 62 proximate the exterior surface of the frame 24 has been beveled slightly to promote the flow of material inwardly as discussed.

FIGS. 6 illustrates still another modified form of the invention, which employs the conical wall 41 as discussed with regard to FIG. 5, but in addition, the head 38 has been provided with an annular notch 66 and a flange 67, which is initially formed on a 2° – 3° taper. This notch 66 and the tapered flange 67 serve to increase the flexibility of the enlarged head portion 38, and enables said head portion and most particularly the flange 67 to adapt to and engage the surface of the frame section 24. The embodiment of FIG. 7, discloses still an additional feature, that of an annular nib 68 which can be formed on the axially facing undersurface of the head portion 38. The nib 68 will bite into the surface of the frame section 24 as the bolt is pulled into clamping engagement, to provide an additional metal-to-metal seal against the entry of moisture past said enlarged head portion 38. For purposes of illustration, nibs 68 have been shown somewhat larger than actual size.

Figure 10:
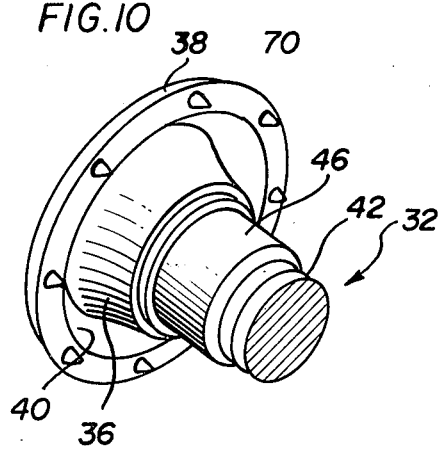

Directing attention now to FIG. 10, there is disclosed an embodiment, which provides an alternative to the employment of the splined unthreaded segment 46. In this embodiment, the undersurface of the enlarged head portion 38 is provided with a series of circumferentially spaced, axially extending lugs or projections 70 designed to bite into the exterior surface of the frame 24, and serve as the means to prevent rotation of the bolt member 32 during assembly.

Returning now to FIG. 8, there is illustrated a modification which can be employed with regard to the nut member 34, of the assembly as shown in FIGS. 1 – 3. As will be recalled, the nut member 34 is disposed interiorly of the container, and it is desirable to maintain the overall general smoothness of the interior container surface. One problem which has been observed, is that during driving of the nut member 34, upon reaching clamping engagement with the interior surface of the panel section 22, there is a tendency for the nut to scarf or otherwise chew up the fiberglass reinforcing material, often to an extent wherein the material is torn or disrupted radially outward of the head portion 50 of said nut member. To overcome this problem, the nut member 34 of FIG. 8, is provided with an axially facing, annular bearing surface 72, which extends beyond the major portion of the nut undersurface. This bearing surface serves to localize the engagement, and preclude the above-mentioned tearing of the fiberglass reinforcement.

Figure 11:
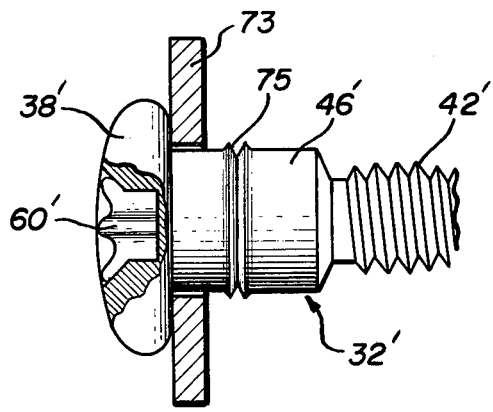
FIG. 11 illustrates a modified type of bolt assembly similar to that as illustrated in FIG. 4, but employing a preassembled washer.

A further method of handling the problem of damage to the interior fiberglass reinforcement layer, is illustrated in FIG. 11, with regard to an arrangement as shown in FIG. 4. As an alternative to the use of the axially facing bearing surfaces 72, a "sems" type of washer arrangement may be employed. In this regard, a washer 73 acts as a bearing between the rotating enlarged head portion 38', and the fiberglass layer to prevent damage thereto. Washer 73 can be assembled as an integral element of the bolt member 32' by the employment of an upset 75, which has an outer diameter slightly larger than the inner diameter of the washer 73, and thereby serves to retain the washer 73 in assembly with bolt member 32'. As an additional feature, the size of the enlarged head portion 38' can be reduced somewhat with this embodiment, as shown.

The embodiment of FIG. 9, is directed to a modification in the unthreaded, knurled segment 46, which will facilitate initial seating of the bolt member 32. As illustrated, the enlarged unthreaded segment 46 is joined with the threaded end portion 42 by a conically formed surface 74, with the unthreaded segment 46 having a bulbous, increased diameter portion 76 immediately adjacent the conical surface 74. The splines or knurls 50 on the segment 46 extends onto the bulbous portion 76. Accordingly, during initial seating, tapered surface 74 and bulbous portion 76 serves to facilitate the initial engagement with the periphery of the aperture 62 and the frame section. In this regard, the tapered portion 74 and bulbous portion 76 act as an extrusion media which will cause the frame material to flow around the bulbous portion 76, thus increasing the locking action achieved due to the embedding of the splines 50 in the frame material. Also the friction produced upon engagement is reduced by use of the bulbous portion 76, primarily due to the relief area provided, which enables the metal to flow around said bulbous portion 76.

Figure 12:
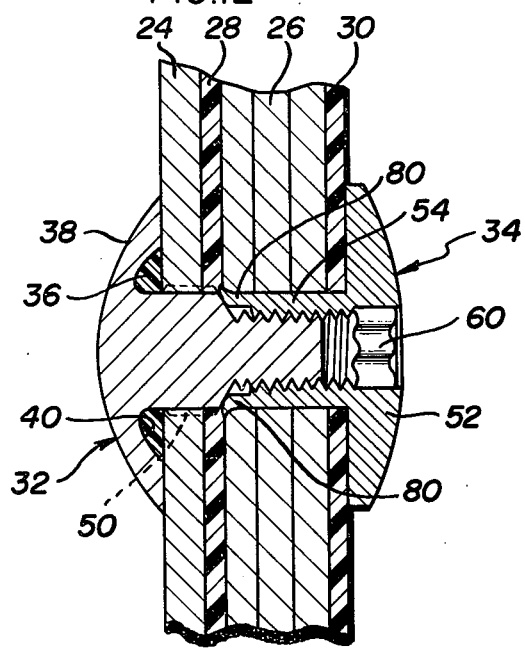
FIG. 12 illustrates a modified type of joint assembly which provides for deformation of the nut member into piercing engagement with the panel section.

Attention is now directed to the embodiment of FIG. 12 wherein a further modified version of the fastener assembly 20 is illustrated. In this regard, the elongated sleeve portion 54 includes an axially extending segment 80. The unthreaded segment 46 of the bolt member merges with the threaded segment 44, along a tapered abutment surface 82, and the respective components of the fastener assembly 20 are sized, in relation to the thickness of the frame member 24 and panel section 22, so that the extension 80 will be brought into contact with the abutment surface 82 upon attainment of clamped engagement. The extension 80 is deformable and upon abutting the surface 82, will be flared outwardly to pierce the plywood laminate 26, and thereby increase the holding and pushout strength of the joint.

Figure 13:
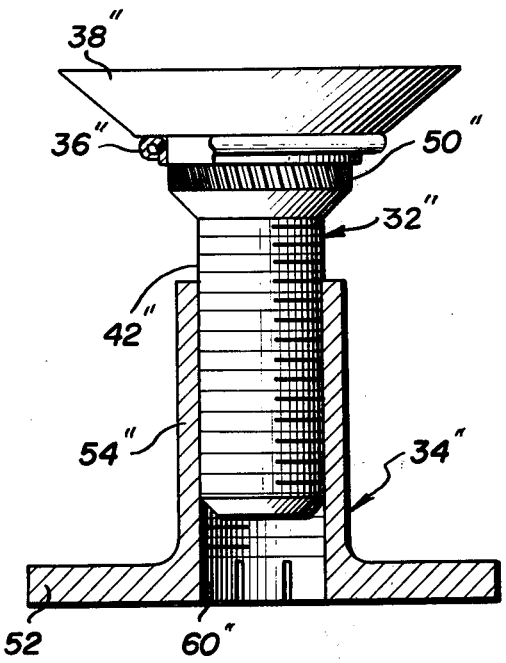
FIG. 13 illustrates still a further modified arrangement wherein the bolt member is provided with a tapered, flat head portion, designed to be counter sunk relative to the exterior surface of the frame section.
Figure 14:
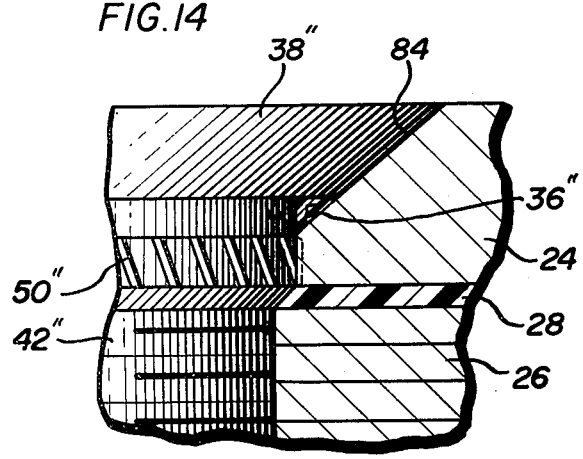
FIG. 14 is an enlarged, partial sectional view of a joint achieved with the fastener assembly of FIG. 13.

In FIGS. 13 and 14, still another form of the proposed invention is disclosed. In this embodiment, the enlarged head portion 38, has been replaced by a flat head type of arrangement 38" designed to be seated in a tapered counter sink 84 formed in the frame section 24, as best seen in FIG. 14. In addition, the gasket member 36 as illustrated, and as discussed previously, is now replaced by an annular, gasket member 36" which is of a triangular cross-section and designed to abut the counter sink 84 in sealed engagement therewith. Obviously, with the embodiments of FIGS. 13 and 14, the tamper-proof head 38" will be recessed to a position flush with the outer surface of the frame section 24, to render more difficult tampering with the joint.

Figure 15:
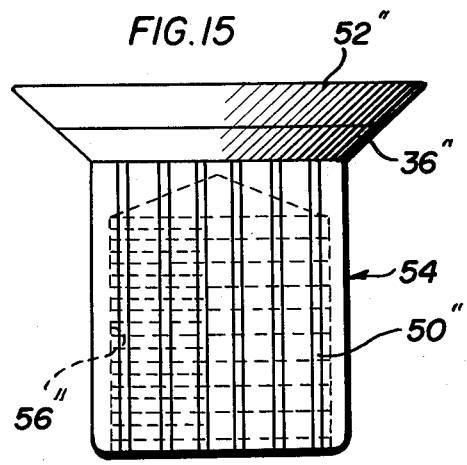
FIG. 15 illustrates still an additional modified form of the nut member employable with the embodiment of FIG. 4.

FIG. 15 illustrates a nut member 34''', which can be used as an alternative to the nut 34' employed with regard to the embodiment of FIG. 4. The nut 34''' of FIG. 15 differs from that as discussed with regard to FIG. 4, in that the bulbous enlarged head portion 38' has been replaced by a flat head arrangement adapted to be countersunk with respect to the surface of the metal frame section 24, as discussed with regard to FIGS. 13 and 14.

Accordingly, while there is disclosed a number of embodiments of a novel fastener assembly, it is envisioned and anticipated that those skilled in the art may well devise additional variations and modifications, which fall within the spirit and scope of the invention as defined by the claims appended hereto.

The invention is claimed as follows:

1. In combination, a section of composite panel or the like and a rigid frame section wherein both said panel and frame section define a through bore, and a fastener assembly disposed in said bore in clamping engagement with said panel and frame section to define a joint therebetween, said fastener assembly comprising; a bolt member having a first enlarged head portion at one end and an elongate shank, said shank including an externally threaded segment and an external unthreaded segment disposed intermediate said threaded segment and said enlarged head portion, and a nut member including an elongate sleeve segment having an exterior, unthreaded surface and an internal bore having an internally threaded surface portion engaged with said threaded segment of the bolt member, and a second enlarged head portion on said nut member, such that said enlarged head portions engage said panel and frame sections to effect said clamping engagement, the one of said members having its head portion engaged with said frame section including a plurality of axially extending splines formed on the exterior unthreaded surface portion of said one member and engaged with said bore, said splines having a maximum diameter greater than the diameter of said bore and the diameter of the unthreaded external surface portion on said other member, with the root diameter of said splines being less than the diameter of said bore, and annular axially facing groove means on the enlarged head portion of said one member, with a sealing member disposed in said groove means and compressed into tight sealing contact with said frame section, and the unthreaded exterior surface of said other member being received in said bore and rotatable with respect to said bore, and drive tool accomodating means formed on said enlarged head portion of said other member to permit driving of said other member to obtain said clamped engagement, said one member being engaged in said frame section bore with the relationship of said splines maximum and root diameter to said bore diameter tending to center said one member relative to said bore during initial engagement, while permitting said member to move axially inward during engagement of said threaded surfaces pursuant to driving of said other member to attain clamped engagement, said splines and the unthreaded surface upon which they are formed both having an axial length such that they extend beyond the portion of the bore defined by said frame section, into that portion formed by said panel section to provide increased resistance to the shearing forces applied to said member at the interface of said panel and frame sections.

2. A combination as defined in claim 1, wherein said groove means is formed in said enlarged head portion of said bolt member, and said drive tool receiving means is formed in the enlarged head portion of said nut member.

3. A combination as defined in claim 1, wherein said groove means is formed in said enlarged portion of said nut member, and said drive tool accommodating means is formed in the enlarged head portion of said bolt member.

4. A combination as defined in claim 1, wherein said splines are straight.

5. A combination as defined in claim 1, wherein said splines are formed on a helix.

6. A combination as defined in claim 5, wherein said spline helix is disposed oppositely of the threads on said bolt and nut members.

7. A combination as defined in claim 1, wherein said groove includes a radially outer conical wall surface merging in a direction towards said enlarged head portion, with the volume of said groove selected to be less than the volume of said sealing means, whereby upon attainment of clamped engagement, said sealing means is compressed with said conical wall directing sealing material into the annular space defined by said frame bore and said one member engaged therewith.

8. A combination as defined in claim 1, wherein said elongate internally threaded sleeve includes an unthreaded, deformable extension, and said bolt member includes an outwardly tapered abutment surface against which said extension is engaged and deformed outwardly to embed in said composite panel.

9. A combination as defined in claim 1 wherein the bore in said nut member extends the entire length of said member, and said drive tool accommodating means is formed on the enlarged head portion of said nut member, such that said nut member constitutes said other member and said bolt member said one member engaged with said frame section, said through bore permitting the externally threaded portion of said bolt member to be viewed as said nut member is disposed in said bore to assist in attaining initial threaded engagement.

10. A combination as defined in claim 1, wherein said enlarged head portion on said bolt member is of a conical shape, and said bore in said frame section includes a correspondingly shaped counter-bore, such that said enlarged head portion is received in said counter-bore and is deposited flush with the surface of said panel section.

* * * * *

UNITED STATES PATENT AND TRADEMARK OFFICE
CERTIFICATE OF CORRECTION

PATENT NO. : 4,033,243
DATED : July 5, 1977
INVENTOR(S) : Hail Kirrish and Albert J. Provenzano It is certified that error appears in the above-identified patent and that said Letters Patent are hereby corrected as shown below:

Column 1, line 14, "having" should be --without--;

Column 2, line 1, "performed" should be --preformed--;

Column 4, line 45, after "62," insert --there--;

Signed and Sealed this

First Day of November 1977

[SEAL]

Attest:

RUTH C. MASON
*Attesting Officer*

LUTRELLE F. PARKER
*Acting Commissioner of Patents and Trademarks*